United States Patent
Kashiwagi

(10) Patent No.: US 10,530,118 B2
(45) Date of Patent: Jan. 7, 2020

(54) FIBER LASER SYSTEM, REFLECTION RESISTANCE EVALUATION METHOD AND REFLECTION RESISTANCE IMPROVEMENT METHOD FOR SAME, AND FIBER LASER

(71) Applicant: FUJIKURA LTD., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/770,585

(22) PCT Filed: Oct. 26, 2016

(86) PCT No.: PCT/JP2016/081721
§ 371 (c)(1),
(2) Date: Apr. 24, 2018

(87) PCT Pub. No.: WO2017/073609
PCT Pub. Date: May 4, 2017

(65) Prior Publication Data
US 2018/0287331 A1    Oct. 4, 2018

(30) Foreign Application Priority Data
Oct. 30, 2015   (JP) .................... 2015-214485

(51) Int. Cl.
*H01S 3/13*       (2006.01)
*H01S 3/067*     (2006.01)
(Continued)

(52) U.S. Cl.
CPC .......... *H01S 3/1305* (2013.01); *G01J 1/4257* (2013.01); *H01S 3/067* (2013.01); *H01S 3/10015* (2013.01); *H01S 3/2383* (2013.01)

(58) Field of Classification Search
CPC .. H01S 3/1305; H01S 3/10015; H01S 3/2383; H01S 3/0912; H01S 3/00;
(Continued)

(56) References Cited

U.S. PATENT DOCUMENTS 5,217,306 A * 6/1993 Wada ............... G01K 11/32
                                                              356/301
2003/0002041 A1 * 1/2003 Peupelmann .......... G01J 4/00
                                                              356/364
(Continued)

FOREIGN PATENT DOCUMENTS

CN    101807773 A    8/2010
CN    101842946 A    9/2010
(Continued)

OTHER PUBLICATIONS

English Translation of WO2012165389 (Year: 2012).*
(Continued)

*Primary Examiner* — Yuanda Zhang
(74) *Attorney, Agent, or Firm* — Westerman, Hattori, Daniels & Adrian, LLP

(57) ABSTRACT

Reflection resistances of respective fiber lasers in a state where an entire fiber laser system is in operation are evaluated. Each of fiber lasers (2 through 4) includes (i) a laser beam measuring section (28) configured to measure a power of a laser beam which a low reflection FBG (26) has transmitted therethrough and (ii) a Stokes beam measuring section (29) configured to measure a power of a Stokes beam which a high reflection FBG (24) has transmitted therethrough.

5 Claims, 2 Drawing Sheets

(51) Int. Cl.
*H01S 3/10* (2006.01)
*G01J 1/42* (2006.01)
*H01S 3/23* (2006.01)

(58) Field of Classification Search
CPC .. H01S 3/067; H01S 3/094003; G01J 1/4257; B23K 26/0604
See application file for complete search history.

(56) References Cited

U.S. PATENT DOCUMENTS

| | | | |
|---|---|---|---|
| 2005/0141582 A1* | 6/2005 | Lee | G02F 2/002 372/84 |
| 2005/0237601 A1* | 10/2005 | Nakaji | H01S 3/06754 359/334 |
| 2006/0165343 A1* | 7/2006 | Seifert | G01M 11/37 385/12 |
| 2007/0177254 A1* | 8/2007 | Ghera | H04B 10/0797 359/334 |
| 2011/0091155 A1* | 4/2011 | Yilmaz | G02B 6/4207 385/30 |
| 2011/0134940 A1* | 6/2011 | Hartog | G01D 5/35335 372/6 |
| 2012/0269217 A1 | 10/2012 | Senda | |
| 2013/0299474 A1* | 11/2013 | Kashiwagi | H01S 3/067 219/121.81 |
| 2014/0071518 A1* | 3/2014 | Inbar | H01S 3/0064 359/327 |
| 2014/0268313 A1* | 9/2014 | Nakai | H01S 3/1024 359/345 |
| 2015/0214692 A1 | 7/2015 | Miyato et al. | |
| 2015/0375337 A1 | 12/2015 | Hayashi | |
| 2016/0003687 A1* | 1/2016 | Takeuchi | G01K 11/32 356/73.1 |
| 2016/0254637 A1 | 9/2016 | Ikoma et al. | |

FOREIGN PATENT DOCUMENTS

| | | |
|---|---|---|
| CN | 102185243 A | 9/2011 |
| CN | 204621354 U | 9/2015 |
| JP | 2012-227353 A | 11/2012 |
| JP | 2015-95641 A | 5/2015 |
| WO | 2012/165389 A1 | 12/2012 |
| WO | 2014/014068 A1 | 1/2014 |
| WO | 2014/133013 A1 | 9/2014 |

OTHER PUBLICATIONS

Office Action dated Nov. 1, 2016, issued in counterpart of Japanese Patent Application No. 2015-214485 (2 pages).
International Search Report dated Jan. 17, 2017, issued in Counterpart of International Application No. PCT/JP2016/081721 (2 pages).
Extended (supplementary) European Search Report dated Oct. 15, 2018, issued in counterpart European Application No. 16859839.9. (10 pages).
Office Action dated Apr. 16, 2019, issued in counterpart JP Application No. 2017-547824, with English translation (6 pages).

* cited by examiner

FIBER LASER SYSTEM, REFLECTION RESISTANCE EVALUATION METHOD AND REFLECTION RESISTANCE IMPROVEMENT METHOD FOR SAME, AND FIBER LASER

TECHNICAL FIELD

The present invention relates to (i) a fiber laser system including a plurality of fiber lasers, (ii) a method of evaluating a reflection resistance of the fiber laser system, (iii) a method of improving the reflection resistance of the fiber laser system, and (iv) a fiber laser.

BACKGROUND ART

In recent years, a fiber laser system in which laser beams emitted from a respective plurality of fiber lasers are combined and outputted as a multi-mode beam has been attracting attention as a way to achieve an output power of several kW (kilowatts). Such a fiber laser system is used mainly in the field of material processing.

In the above fiber laser system, there is a risk that light reflected by a processing target object, which is to be subjected to material processing, may return to the fiber laser system and cause a malfunction of it.

A reason for such malfunctioning of the fiber laser system resides in occurrence of stimulated Raman scattering (hereinafter also referred to as "SRS") in a passage through which a laser beam propagates in the fiber laser system. The SRS can be considered as a process of power conversion from a laser beam to a Stokes beam. It is known that an increase in conversion efficiency (Raman gain) of the SRS leads to a greater likelihood of occurrence of Stokes beam oscillation. As a result, an oscillation state of each fiber laser becomes unstable and malfunctions occur in each fiber laser (see Patent Literature 1).

CITATION LIST

Patent Literature

[Patent Literature 1]
Japanese Patent Application Publication Tokukai No. 2015-95641 (Publication date: May 18, 2015)

SUMMARY OF INVENTION

Technical Problem

In a conventional fiber laser system, typically, a plurality of fiber lasers are caused to emit laser beams of equal powers. However, the inventor of the present invention made a diligent study and, as a result thereof, found that fiber lasers may differ from each other in degree of likelihood of occurrence of oscillation at a wavelength of a Stokes beam caused by SRS, i.e., they may differ from each other in reflection resistance, even in a case where the fiber lasers emit laser beams of equal powers.

The inventor of the present invention also found that, in a case where SRS occurs in any one of a plurality of fiber lasers in a fiber laser system, a Stokes beam having occurred in the any one of the plurality of fiber lasers is reflected by a processing target object, returns to the fiber laser system, and then propagates to the others of the plurality of fiber lasers via, for example, a combiner. This causes SRS to occur also in the others of the plurality of fiber lasers. As a result, the oscillation occurs in all of the plurality of fiber lasers.

Therefore, in order to achieve a fiber laser system having a high reflection resistance (i.e., a fiber laser system in which the oscillation is hard to occur) as a whole system, it is necessary to (i) evaluate reflection resistances of respective fiber lasers and (ii) control a lowest reflection resistance of a corresponding fiber laser (in which the oscillation is likely to occur) to be increased approximately to levels of reflection resistances of the other fiber lasers.

In order to carry out such control, it is necessary to evaluate the reflection resistances of the respective fiber lasers. In so doing, the reflection resistances of the respective fiber lasers in a state where an entire fiber laser system is in operation should be evaluated. This is because the oscillation that occurs in each of the fiber lasers of the fiber laser system is, as described above, a phenomenon in which Stokes beams generated in the other fiber lasers are involved. As long as a conventional evaluation method, in which reflection resistances of respective fiber lasers are evaluated independently from each other apart from a fiber laser system, is used, it is difficult to achieve a fiber laser system having a high reflection resistance.

The present invention was accomplished in view of the above problem, and an object of the present invention is to provide (i) a fiber laser system which enables evaluation of reflection resistances of respective fiber lasers in a state where the entire fiber laser system is in operation, (ii) a method of evaluating a reflection resistance of the fiber laser system, (iii) a method of improving the reflection resistance of the fiber laser system, and (iv) a fiber laser.

Solution to Problem

In order to attain the above object, a fiber laser system in accordance with an embodiment of the present invention includes: a plurality of fiber lasers, each of the plurality of fiber lasers including a laser beam measuring section, a Stokes beam measuring section, a low reflection mirror, and a high reflection mirror, the laser beam measuring section being configured to measure a power of a laser beam which the low reflection mirror has transmitted therethrough, the Stokes beam measuring section being configured to measure a power of a Stokes beam which the high reflection mirror has transmitted therethrough.

According to the above configuration, it is possible to evaluate, for each of the plurality of fiber lasers, a reflection resistance based on a relationship between (i) a result of measurement made by the laser beam measuring section and (ii) a result of measurement made by the Stokes beam measuring section. This allows evaluation of the reflection resistances of the respective fiber lasers in a state where the entire fiber laser system is in operation.

A method of evaluating a reflection resistance of a fiber laser system in accordance with an embodiment of the present invention is a method of evaluating a reflection resistance of each of a plurality of fiber lasers in a fiber laser system, the method including the steps of: (a) measuring a first power of a laser beam which the low reflection mirror of each of the plurality of fiber lasers has transmitted therethrough; (b) measuring a second power of a Stokes beam which the high reflection mirror of the each of the plurality of fiber lasers has transmitted therethrough; and (c) calculating, for each of the plurality of fiber lasers, a ratio of the second power to the first power, based on a result of measurement made in the step (a) and a result of measurement made in the step (b).

According to the above configuration, by evaluating the ratio in the step (c), it is possible to quantitatively evaluate the reflection resistances of the respective fiber lasers in a state where the entire fiber laser system is in operation.

A method of improving a reflection resistance of a fiber laser system in accordance with an embodiment of the present invention is a method of improving a reflection resistance of a fiber laser system which includes a plurality of fiber lasers, the method including the steps of: (a) calculating, for each of the plurality of fiber lasers, the ratio in accordance with the method described above; and (b) reducing a maximum value of the ratio in each of the plurality of fiber lasers, by (i) selecting, from the plurality of fiber lasers, at least one fiber laser including a fiber laser in which the value is the largest and (ii) carrying out power down control in which a power of a laser beam which is emitted from the at least one fiber laser selected from the plurality of fiber lasers is reduced.

As described earlier, the smaller the power of the laser beam is, the smaller the ratio tends to become. According to the above configuration, in the step (b), the power of the laser beam emitted from the at least one fiber laser including a fiber laser in which the ratio is the largest is reduced based on the above tendency. This allows a reduction in maximum value of the ratio in each of the fiber lasers, and ultimately allows an increase in reflection resistance of the entire fiber laser system.

A fiber laser in accordance with an embodiment of the present invention includes: an amplifying optical fiber; a low reflection mirror provided at one end of the amplifying optical fiber; a high reflection mirror provided at the other end of the amplifying optical fiber; a laser beam measuring section configured to measure a power of a laser beam which the low reflection mirror has transmitted therethrough; and a Stokes beam measuring section configured to measure a power of a Stokes beam which the high reflection mirror has transmitted therethrough.

According to the above configuration, it is possible to achieve a fiber laser that can be used in the above fiber laser system. The same applies to a case where at least one fiber laser of the fiber laser system is replaced with an optical terminator or the like.

Advantageous Effects of Invention

According to an embodiment of the present invention, it is possible to evaluate reflection resistances of respective fiber lasers in a state where an entire fiber laser system is in operation.

DESCRIPTION OF EMBODIMENTS

The following description will discuss an embodiment of the present invention with reference to FIGS. 1 through 4.

Figure 1:
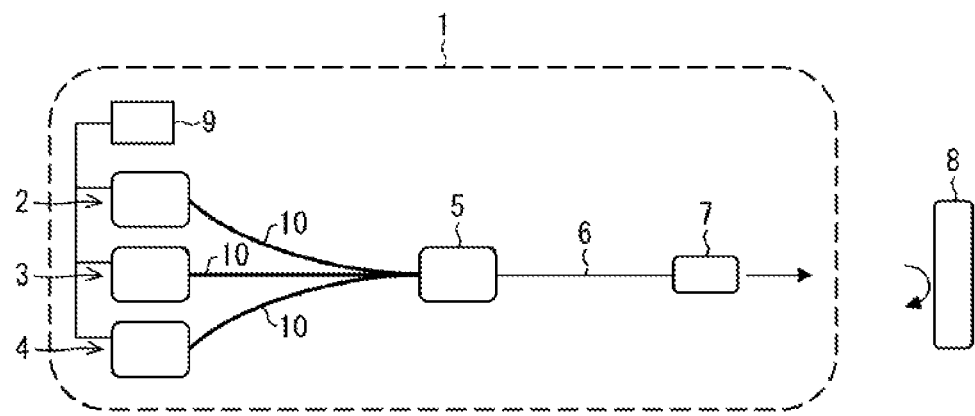
FIG. 1 is a view schematically showing a configuration of a fiber laser system in accordance with an embodiment of the present invention.

FIG. 1 is a view schematically showing a configuration of a fiber laser system 1 in accordance with an embodiment of the present invention. The fiber laser system 1 includes three (3) (a plurality of) fiber lasers 2 through 4, an output combiner 5, a multi-mode fiber 6, an output section 7, a calculation processing section 9, and three (3) (a plurality of) optical fibers 10. The fiber laser system 1 processes a processing target object 8 by irradiating the processing target object 8 with a laser beam. Examples of the processing target object 8 include steel materials (such as mild steel, carbon steel, and stainless steel), non-ferrous materials (such as aluminum, copper, and magnesium), brittle materials (such as ceramics and glass), and other types of materials (such as plastic and resin). Of the laser beam with which the processing target object 8 is irradiated, approximately 5% to 10% is reflected by the processing target object 8. The laser beam thus reflected may sometimes return to the fiber laser system 1. The laser beam thus returned to the fiber laser system 1 may adversely affect an ideal operation of the fiber laser system 1.

The fiber lasers 2 through 4 each generate a laser beam and are each connected to the output combiner 5 via a corresponding one of the optical fibers 10. Each of the optical fibers 10, which is used to connect a corresponding one of the fiber lasers 2 through 4 to the output combiner 5, is a single-mode optical fiber or a so-called quasi-single-mode optical fiber. The fiber lasers 2 through 4 each employ a silica glass optical fiber as a laser medium. A configuration of each of the fiber lasers 2 through 4 will be later described in detail, with reference to FIG. 2.

The output combiner 5 serves to combine laser beams generated by the respective fiber lasers 2 through 4. A laser beam thus combined propagates, as a multi-mode beam, through the multi-mode fiber 6, and is then emitted via the output section 7 to outside the fiber laser system 1 (e.g., toward the processing target object 8).

Note that each of (i) optical fibers constituting the fiber lasers 2 through 4, (ii) the optical fibers 10, and (iii) the multi-mode fiber 6 is made of silica glass. Each of the optical fibers generally has a light reflectance of approximately $10^{-5}$% per meter. Recursive amplification of a Stokes beam is caused by (i) reflection of a laser beam from the processing target object 8 and (ii) reflection of light from the optical fibers. This causes a notable oscillation at a wavelength of a Stokes beam caused by SRS. Note that the calculation processing section 9 includes a calculation section 91 and a control section 92, each of which will be specifically described later.

Figure 2:
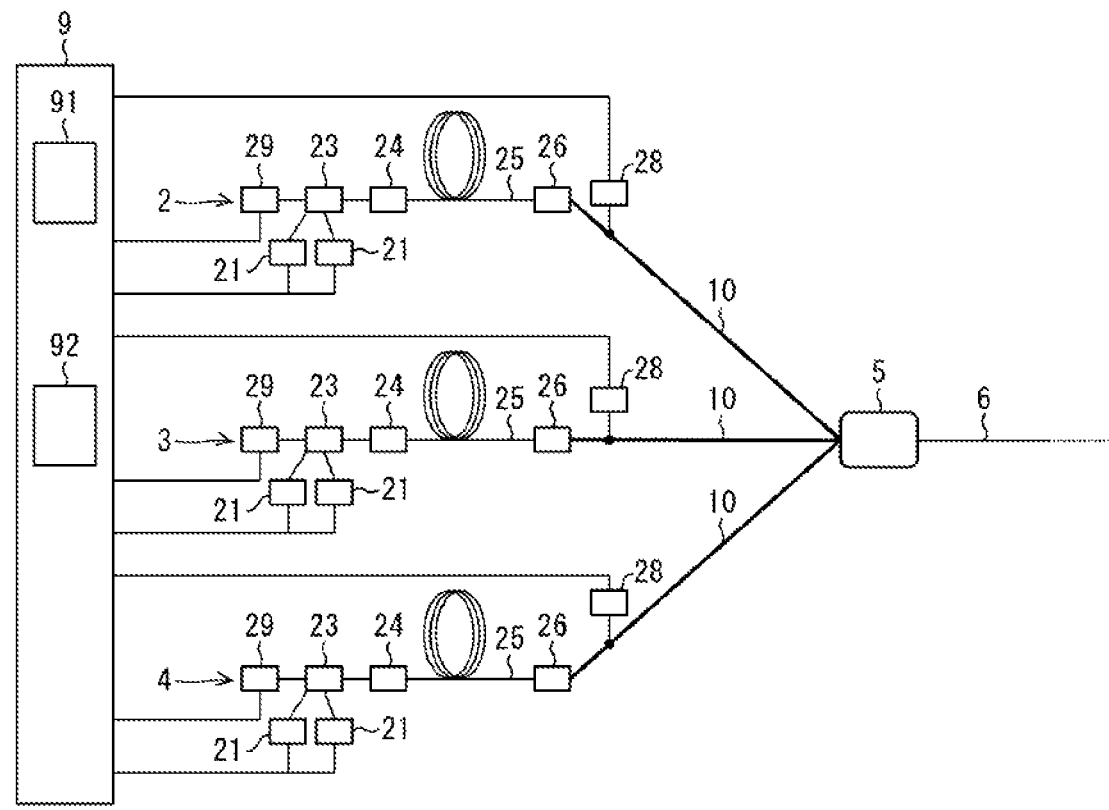
FIG. 2 is a view schematically showing fiber lasers of the fiber laser system shown in FIG. 1 and their peripheries.

FIG. 2 is a view schematically showing the fiber lasers 2 through 4 of the fiber laser system 1 and their peripheries.

As illustrated in FIG. 2, the fiber laser 2 is connected to the output combiner 5 via a corresponding one of the optical fibers 10. The fiber laser 2 includes (i) a plurality of excitation light sources (light emitting devices) 21, (ii) a pump combiner 23, (iii) an amplifying optical fiber 25, (iv) a high reflection FBG (Fiber Bragg Grating) 24 serving as a mirror, (v) a low reflection FBG 26 serving as a half mirror, (vi) a laser beam measuring section 28, and (vii) a Stokes beam measuring section 29. The fiber laser 2 serves as a resonator-type fiber laser in which a zone, between the high reflection FBG (high reflection mirror) 24 and the low reflection FBG (low reflection mirror) 26 of the amplifying optical fiber 25, serves as a resonator. As with the multimode fiber 6, the amplifying optical fiber 25 and the optical fibers 10 each have a core made of silica glass. The core causes a laser beam to propagate therethrough.

An optical fiber, via which the pump combiner 23 and the amplifying optical fiber 25 are connected, can be similar in configuration to the amplifying optical fiber 25. Note, however, that no active element is added to a core of the optical fiber via which the pump combiner 23 and the amplifying optical fiber 25 are connected.

The amplifying optical fiber 25 is a double-cladding fiber having a core to which an active element (e.g., rare earth element) is added. The high reflection FBG 24 is provided at one end of the amplifying optical fiber 25. The low reflection FBG 26 is provided at the other end of the amplifying optical fiber 25. The high reflection FBG 24 is configured to reflect a laser beam generated in the amplifying optical fiber 25. The high reflection FBG 24 has a reflectance of, for example, 99% or more when a laser beam oscillates at a lasing wavelength. The low reflection FBG 26 is configured to (i) reflect part of a laser beam generated in the amplifying optical fiber 25 and (ii) transmit remaining part of the laser beam. The low reflection FBG 26 has a reflectance set to be lower than that of the high reflection FBG 24. The reflectance of the low reflection FBG 26 is, for example, 10% when a laser beam oscillates at a lasing wavelength. The plurality of excitation light sources 21 are each a light source of excitation light to be supplied to the amplifying optical fiber 25, and are each connected to the amplifying optical fiber 25 via the pump combiner 23.

In the fiber laser 2, excitation light emitted from the plurality of excitation light sources 21 enters a first cladding of the amplifying optical fiber 25, via the pump combiner 23. Then, when the excitation light guided through the first cladding of the amplifying optical fiber 25 passes through a core of the amplifying optical fiber 25, the excitation light causes the active element, which is added to the core, to undergo a transition to a population inversion state. The active element, thus caused to undergo the transition to the population inversion state, triggers a chain reaction of induced emission while spontaneous emission light serves as a seed beam. A laser beam which is subjected to the induced emission is recursively amplified by being repeatedly reflected between the high reflection FBG 24 and the low reflection FBG 26.

The laser beam measuring section 28 is provided between the low reflection FBG 26 and the output combiner 5, so as to measure a power of a laser beam existing on an output of the low reflection FBG 26 side of the fiber laser 2 (i.e. a power of a laser beam which the low reflection mirror has transmitted therethrough).

The Stokes beam measuring section 29 is configured to measure a power of a Stokes beam that (i) is caused by laser beams which are simultaneously emitted from the respective fiber lasers 2 through 4 and (ii) propagates in the fiber laser 2. The Stokes beam measuring section 29 is provided on an opposite side of the amplifying optical fiber 25 with respect to the high reflection FBG 24 (i.e. a side opposite to an output side with respect to the mirror). The Stokes beam measuring section 29 measures a power of a Stokes beam existing on an output of the high reflection FBG 24 side of the fiber laser 2 (i.e. a power of a Stokes beam which the high reflection mirror has transmitted).

Based on a result of measurement made by the laser beam measuring section 28 and a result of measurement made by the Stokes beam measuring section 29, the calculation section 91 calculates, for each of the fiber lasers 2 through 4, a ratio of (i) the power of the Stokes beam which the high reflection FBG 24 has transmitted therethrough to (ii) the power of the laser beam which the low reflection FBG 26 has transmitted therethrough. The control section 92 is configured to reduce a maximum value of the ratio in each of the fiber lasers 2 through 4, by (i) selecting, from the fiber lasers 2 through 4, at least one fiber laser including a fiber laser in which the ratio is the largest and (ii) carrying out power down control in which a power of a laser beam emitted from the at least one fiber laser thus selected is reduced.

The control section 92 is configured to adjust powers of laser beams in the respective fiber lasers 2 through 4, by adjusting electric currents to be supplied to the respective plurality of excitation light sources 21 each of which emits excitation light for a corresponding one of the fiber lasers. This allows the powers of the respective laser beams to be easily adjusted.

The following description will discuss a method of evaluating a reflection resistance of the fiber laser 2 with the use of the laser beam measuring section 28 and the Stokes beam measuring section 29. The reflection resistance (i.e., unlikelihood of occurrence of oscillation at a wavelength of a Stokes beam caused by SRS) of the fiber laser 2 in a state where the entire fiber laser system 1 is in operation (i.e., while the fiber lasers 2 through 4 are simultaneously emitting respective laser beams) can be calculated based on a ratio of (i) a result of measurement made by the Stokes beam measuring section 29 to (ii) a result of measurement made by the laser beam measuring section 28. Note that a reflection resistance of a fiber laser refers to a ratio of (i) a power of a Stokes beam propagating in the fiber laser to (ii) a power of a laser beam emitted from the fiber laser. In a case where the ratio is small (i.e., the power of the Stokes beam is small) because of a reason described below, the reflection resistance of the fiber laser can be considered high. That is, in a case where the power of the Stokes beam is relatively small on the basis of the power of the laser beam, it means that a Raman gain (i.e., a degree of energy being transferred from the laser beam to the Stokes beam) is small and a loss of the Stokes beam is large even in a case where the power of the laser beam is fixed. It follows that in a case where the laser beam is reflected, at a fixed reflectance, by the processing target object 8, the oscillation becomes hard to occur because a threshold of oscillation is high. Note that the Raman gain becomes large in response to an increase in the power of the laser beam. This is because the Raman gain G is expressed by G∝exp (power of laser beam×length of fiber/effective core area of the fiber) in amplification of the power of the Stokes beam due to the above oscillation. Therefore, oscillation occurs even in a case of small reflection. This causes the oscillation of the laser beam to be unstable. Therefore, in a case where the ratio is small, a reflection resistance of a fiber laser can be considered high. The fiber lasers 2 through 4 of the fiber laser system 1 may differ from each other in reflection resistance. The reason thereof resides, for example, in that (i) lengths and/or losses of the amplifying optical fibers 25 or the optical fibers 10 differ from each other or (ii) branching ratios and/or losses of laser beams in the output combiner 5 differ from each other. In other words, the reflection resistance of the fiber laser 2 can be obtained from a ratio of (result of measurement made by the Stokes beam measuring section 29)/(result of measurement made by the laser beam measuring section 28). It can be said that the smaller the ratio (solution) is, the higher the reflection resistance of the fiber laser 2 is. In a case where Stokes beam is relatively large on the basis of the laser beam, it means that a Raman gain is large (transfer of energy from the laser beam to the Stokes beam is large) and a loss is small even in a case where the power of a laser beam is fixed. Specifically, in a case where a power is returned, at a fixed reflectance, from an object, the Stokes beam is likely to satisfy a relation of Loss≤Gain. This means that a threshold of oscillation is low, and the oscillation is therefore likely to occur. That is, it can be said that since the oscillation at a wavelength of the Stokes beam caused by SRS is likely to occur, the reflection resistance is low.

It is assumed here that, for example, (i) a result of measurement made by the laser beam measuring section 28 indicates 1 kW, i.e., a power of a laser beam emitted from the fiber laser 2 is 1 kW and (ii) a result of measurement made by the Stokes beam measuring section 29 indicates 0.00014 W, i.e., a power of a Stokes beam propagating in the fiber laser 2 in a state where the entire fiber laser system 1 is in operation is 0.00014 W. Under such an assumption, with the use of the calculation section 91, it is possible to evaluate, as $0.00014/1000=1.4\times10^{-7}$, the reflection resistance of the fiber laser 2 in a state where the entire fiber laser system 1 is in operation.

The laser beam measuring section 28 and the Stokes beam measuring section 29 can each include a filter member for blocking light having a frequency other than a desired frequency. More specifically, in each of the fiber lasers 2 through 4, (i) the laser beam measuring section 28 can include a wavelength selecting filter that selectively transmits therethrough light having a lasing wavelength of a corresponding one of the fiber lasers 2 through 4 and (ii) the Stokes beam measuring section 29 can include a wavelength selecting filter that selectively transmits therethrough light having a wavelength obtained by adding, to the lasing wavelength of the corresponding one of the fiber lasers 2 through 4, a wavelength corresponding to a Raman shift. This allows the laser beam measuring section 28 and the Stokes beam measuring section 29 to accurately measure a laser beam and a Stokes beam, respectively.

Note that, in the fiber laser system 1, the fiber lasers 3 and 4 are identical in configuration to the fiber laser 2. It is therefore possible to evaluate reflection resistances of the respective fiber lasers 3 and 4 by the method corresponding to the method by which the reflection resistance of the fiber laser 2 is evaluated. By carrying out the above method of evaluating a reflection resistance with respect to each of the fiber lasers 2 through 4, it is possible to achieve a method of evaluating a reflection resistance of the fiber laser system 1.

It can be said that, according to each of the fiber lasers 2 through 4, the larger the ratio is, the more easily SRS occurs. In a state where the entire fiber laser system 1 is in operation, the calculation section 91 can quantitatively evaluate, by calculating the ratios, the reflection resistances of the respective fiber lasers 2 through 4.

Figure 3:
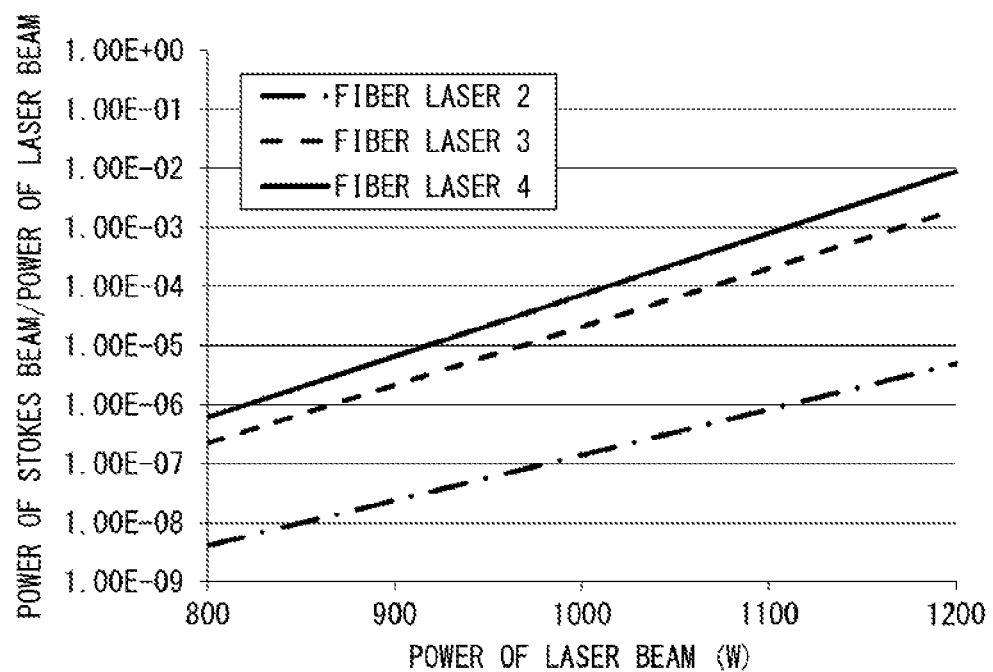
FIG. 3 is a graph showing an example of a relationship between (i) a power of a laser beam and (ii) a power of a Stokes beam/a power of a laser beam (i.e., reflection resistance) in each of the fiber lasers of the fiber laser system shown in FIG. 1.

The following description will discuss, with reference to FIG. 3, a method of improving the reflection resistance of the fiber laser system 1 in which the fiber lasers 2 through 4 are used. FIG. 3 is a graph showing an example of a relationship between (i) a power of a laser beam and (ii) a power of a Stokes beam/a power of a laser beam (i.e., reflection resistance) in each of the fiber lasers 2 through 4. First, the reflection resistances of the respective fiber lasers 2 through 4 are evaluated in a state where the entire fiber laser system 1 is in operation.

Note that the following description will assume the following (i) through (iii): (i) a power of a laser beam emitted by the fiber laser system 1 is 3 kW; (ii) powers of laser beams emitted by the respective fiber lasers 2 through 4 (results of measurements made by the laser beam measuring sections 28 of the respective fiber lasers 2 through 4) are each 1 kW at a stage where the fiber laser system 1 has not been subjected to the improvement in reflection resistance; and (iii) powers of Stokes beams (results of measurements made by the Stokes beam measuring sections 29 of the respective fiber laser 2 through 4) which propagate in the respective fiber lasers 2 through 4 in a state where the entire fiber laser system 1 is in operation, at a stage where the fiber laser system 1 has not been subjected to the improvement in reflection resistance, are 0.00014 W (fiber laser 2), 0.02 W (fiber laser 3), and 0.072 W (fiber laser 4), respectively.

In a state where the entire fiber laser system 1 is in operation, the calculation section 91 evaluates, as $0.00014/1000=1.4\times10^{-7}$ (the fiber laser 2), $0.02/1000=2\times10^{-5}$ (the fiber laser 3), and $0.072/1000=7.2\times10^{-5}$ (the fiber laser 4), the reflection resistances of the respective fiber lasers 2 through 4. In this case, there is a risk, by virtue of the reason later described, that the reflection resistances of the respective fiber lasers 2 and 3 may deteriorate to approximately $7.2\times10^{-5}$ due to the reflection resistance of the fiber laser 4 being lower than those of the respective fiber lasers 2 and 3. Specifically, in a case where a power of a Stokes beam caused by SRS becomes notable in the fiber laser 4 having a low reflection resistance, the Stokes beam is also guided, via the output combiner 5, to the fiber lasers 2 and 3 each having a high reflection resistance. As a result, as with the fiber laser 4 having a low reflection resistance, in the fiber lasers 2 and 3 each having a high reflection resistance, oscillation occurs at a wavelength of a Stokes beam caused by SRS. This causes laser oscillation to be unstable in the fiber lasers 2 and 3 each having a high reflection resistance. Note that a "fiber laser having a high reflection resistance" as used in the present embodiment merely refers to a fiber laser that can maintain a state where the power of a Stokes beam is small. "The power of a Stokes beam in a "fiber laser having a high reflection resistance" is forced to be made large by a "fiber laser having a low reflection resistance"" is just like a deterioration in reflection resistance of the "fiber laser having a high reflection resistance".

The larger the powers of laser beams emitted from the respective fiber lasers 2 through 4 are, the lower (worse) the reflection resistances of the respective fiber lasers 2 through 4 become. The smaller the powers of laser beams emitted from the respective fiber lasers 2 through 4 are, the higher (better) the reflection resistances of the respective fiber lasers 2 through 4 become. This is because a power of a Stokes beam caused by SRS increases exponentially with respect to a power of a laser beam. Moreover, the laser beams emitted from the respective fiber lasers 2 through 4 are not essentially equal to each other in power. That is, even though the power of the laser beam emitted from the fiber laser system 1 is essentially 3 kW, it is not essential for the powers of the laser beams, emitted from the respective fiber lasers 2 through 4, to be equalized, i.e., to be evenly 1 kW.

Therefore, according to the fiber laser system 1, the control section 92 at least controls a power of a laser beam, which is to be emitted from the fiber laser 4 in which the ratio is the largest (i.e., which has the lowest reflection resistance), to be small (power down control). This causes a reduction in maximum value of the ratio in each of the fiber lasers 2 through 4. This allows an improvement in reflection resistance of the entire fiber laser system 1.

In accordance with the graph shown in FIG. 3, the control section 92 controls powers of laser beams, which are to be emitted from the respective fiber lasers 2 through 4, to be 1.185 kW, 0.93 kW, and 0.885 kW, respectively, so that the reflection resistance of the fiber laser system 1 is improved. This causes the reflection resistances of the respective fiber lasers 2 through 4 to be equalized as approximately $4\times10^{-6}$. This ultimately allows a reflection resistance of one of the fiber lasers 2 through 4 to be prevented from being extremely low. Since it is possible to prevent deterioration in reflection resistance from being induced in all of the fiber lasers 2 through 4, it is possible to improve the reflection resistance of the fiber laser system 1. In so doing, note that (i) the power of the laser beam emitted from the fiber laser 2 (unselected fiber laser) is made large (power up control) and (ii) the powers of the laser beams emitted from the respective fiber lasers 3 and 4 (selected fiber lasers) are made small (power down control). Note, however, that after adjustment of a power balance, the reflection resistances of the respective fiber lasers 2 and 3 are prevented from becoming lower than the reflection resistance of the fiber laser 4 which has not subjected to the power balance adjustment. This allows an improvement in reflection resistance of the entire system while restricting a reduction in power of the entire system. In a case where it is unnecessary to restrict the reduction in power of the entire system, the power up control can be omitted.

Note that it is not essential to equalize the reflection resistances of the respective fiber lasers 2 through 4 (to be approximately $4\times10^{-6}$ in this example). That is, the control section 92 can alternatively control the respective fiber lasers 2 through 4 to emit the laser beams whose powers are adjusted so that the reflection resistances become equal to or greater than a certain reflection resistance. Note that a certain value can be set to be greater than $4\times10^{-6}$ and less than $7.2\times10^{-5}$ so that the ratio in each of the fiber lasers 2 through 4 can be made equal to or less than the certain value. In other words, it is possible to (i) select, from the fiber lasers 2 through 4, a fiber laser(s) in which the ratio exceeds a predetermined reflection resistance (certain reflection resistance) and (ii) carry out the power down control in which power(s) of laser beam(s) emitted from the fiber laser(s) thus selected is reduced. Even in such an alternative, the reflection resistances of all of the fiber lasers 2 through 4 can be prevented from inducing deterioration. This allows an improvement in reflection resistance of the fiber laser system 1.

With the configuration of the fiber laser system 1, it is possible to evaluate the reflection resistances of the respective fiber lasers 2 through 4, based on a relationship between (i) respective results of measurement made by the laser beam measuring section 28 and (ii) respective results of measurement made by the Stokes beam measuring section 29. This makes it possible to evaluate the reflection resistances of the respective fiber lasers 2 through 4, in a state where the entire fiber laser system 1 is in operation.

The fiber lasers 2 through 4 are identical in configuration. In other words, the fiber lasers 2 through 4 are identical in arrangement of the Stokes beam measuring section 29. This makes it possible to measure, in each of the fiber lasers 2 through 4, the power of a corresponding Stokes beam under the same conditions.

Figure 4:
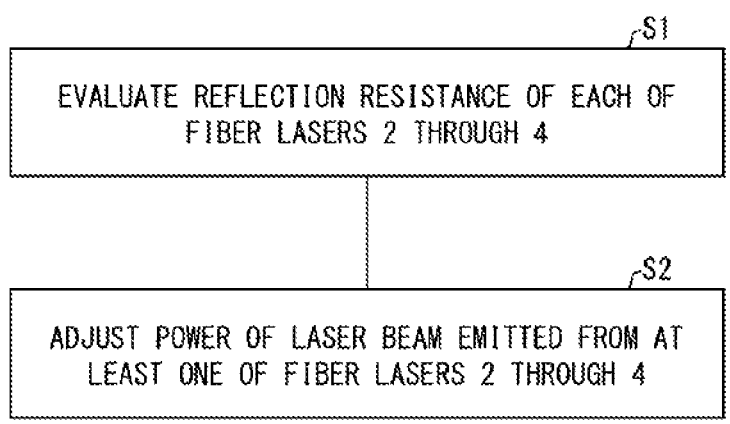
FIG. 4 is a flowchart showing a flow of a method of evaluating a reflection resistance with the use of the fiber laser system shown in FIG. 1 and a method of improving the reflection resistance with the use of the fiber laser system shown in FIG. 1.

FIG. 4 is a flowchart showing a flow carried out by (i) the method of evaluating the reflection resistance of the fiber laser system 1 and (ii) the method of improving the reflection resistance of the fiber laser system 1, particularly with the use of the calculation processing section 9. Note that for simplicity of the description, FIG. 4 shows the steps to be carried out after the following steps (i) and (ii): (i) the step in which the laser beam measuring section 28 measures a power of a laser beam outputted from the low reflection FBG 26 in each of the fiber lasers 2 through 4 (laser beam measuring step) and (ii) the step in which the Stokes beam measuring section 29 measures a power of a Stokes beam outputted from the high reflection FBG 24 in each of the fiber lasers 2 through 4 (Stokes beam measuring step).

First, the calculation section 91 evaluates, for each of the fiber lasers 2 through 4, a reflection resistance by calculating a ratio of (i) a power of a Stokes beam which the high reflection FBG 24 has transmitted therethrough to (ii) a power of a laser beam which the low reflection FBG 26 has transmitted therethrough, based on a result of measurement made by the laser beam measuring section 28 and a result of measurement made by the Stokes beam measuring section 29 (step S1: evaluating step).

Then, the control section 92 adjusts the powers of the laser beams emitted from the respective fiber lasers 2 through 4. Specifically, the control section 92 reduces a maximum value of the ratio in each of the fiber lasers 2 through 4, by (i) selecting, from the fiber lasers 2 through 4, at least one fiber laser including a fiber laser in which the ratio is the largest and (ii) carrying out power down control in which a power of a laser beam emitted from the at least one fiber laser thus selected is reduced (step S2: power adjusting step).

The fiber laser system 1 has a configuration so that each of fiber lasers 2 through 4 includes a laser beam measuring section 28 and a Stokes beam measuring section 29. Note, however, that such a configuration is not essential. That is, it is not necessary for the laser beam measuring section 28 and the Stokes beam measuring section 29 to be included in, for example, any of the fiber lasers 2 through 4 which does not need to be considered in a case of achieving reflection resistance evaluation and reflection resistance improvement in the fiber laser system 1. Furthermore, it is possible to maintain at least one fiber laser of the fiber lasers 2 through 4, while the rest of the fiber lasers 2 through 4 is/are replaced with an optical terminator(s). Moreover, it is possible to incorporate the only one of the fiber lasers 2 through 4 into the fiber laser system 1, by producing only one of the fiber lasers 2 through 4 as a stand-alone fiber laser. It follows that the scope of the present invention also encompasses a fiber laser itself which includes a laser beam measuring section 28 and a Stokes beam measuring section 29. It follows that such a fiber laser can also include a calculation section 91.

A fiber laser system in accordance with an aspect of the present invention includes: a plurality of fiber lasers, each of the plurality of fiber lasers including a laser beam measuring section, a Stokes beam measuring section, a low reflection mirror, and a high reflection mirror, the laser beam measuring section being configured to measure a power of a laser beam which the low reflection mirror has transmitted therethrough, the Stokes beam measuring section being configured to measure a power of a Stokes beam which the high reflection mirror has transmitted therethrough.

According to the above configuration, it is possible to evaluate, for each of the plurality of fiber lasers, a reflection resistance based on a relationship between (i) a result of measurement made by the laser beam measuring section and (ii) a result of measurement made by the Stokes beam measuring section. This allows evaluation of the reflection resistances of the respective fiber lasers in a state where the entire fiber laser system is in operation.

A fiber laser system in accordance with another aspect of the present invention can be configured such that: the laser beam measuring section includes a first wavelength selecting filter which selectively transmits therethrough light having a lasing wavelength of a corresponding one of the plurality of fiber lasers; and the Stokes beam measuring section includes a second wavelength selecting filter which selectively transmits therethrough light having a wavelength which is obtained by adding, to the lasing wavelength of the corresponding one of the plurality of fiber lasers, a wavelength corresponding to a Raman shift.

According to the above configuration, the laser beam measuring section and the Stokes beam measuring section can accurately measure the laser beam and the Stokes beam, respectively.

A fiber laser system in accordance with another aspect of the present invention can be configured to further include: a calculation section configured to calculate, for each of the plurality of fiber lasers, a ratio of (i) the power of the Stokes beam which the high reflection mirror has transmitted therethrough to (ii) the power of the laser beam which the low reflection mirror has transmitted therethrough, based on a result of measurement made by the laser beam measuring section and a result of measurement made by the Stokes beam measuring section.

It can be said that, in each of the plurality of fiber lasers, the larger the ratio is, the more easily oscillation at a wavelength of a Stokes beam occurs due to SRS. According to the above configuration, the calculation section calculates the ratio so that the reflection resistances of the respective fiber lasers can be quantitatively evaluated in a state where the entire fiber laser system is in operation.

A fiber laser system in accordance with another aspect of the present invention can further include: a control section configured to reduce a maximum value of the ratio in each of the plurality of fiber lasers, by (i) selecting, from the plurality of the fiber lasers, at least one fiber laser including a fiber laser in which the ratio is the largest and (ii) carrying out power down control in which a power of a laser beam which is emitted from the at least one fiber laser selected from the plurality of fiber lasers is reduced.

The smaller the power of the laser beam is, the smaller the ratio tends to become. This is because a power of a Stokes beam caused by SRS increases exponentially with respect to a power of a laser beam. According to the above configuration, the control section reduces the maximum value of the ratio in each of the fiber lasers by reducing, based on the above tendency, a power of a laser beam emitted from at least one fiber laser including a fiber laser in which the ratio is the largest. This allows an improvement in reflection resistance of the entire fiber laser system.

A fiber laser system in accordance with the present invention can be configured such that: the control section reduces a difference between the ratio as to the at least one fiber laser thus selected and a ratio as to an unselected fiber laser, by (i) carrying out the power down control or (ii) carrying out both of (a) power up control in which a power of a laser beam which is emitted from the unselected fiber laser is increased and (b) the power down control.

According to the above configuration, it is possible to equalize the reflection resistances of the respective fiber lasers. Furthermore, in a case where the power up control is to be carried out, it is possible to improve the reflection resistance of the entire fiber laser system while restricting a reduction in power of the entire fiber laser system.

A fiber laser system in accordance with another aspect of the present invention can be configured such that: the control section selects a fiber laser in which the ratio exceeds a predetermined ratio, from the plurality of fiber lasers, as a target for which a power of a laser beam is to be reduced.

According to the above configuration, it is possible to cause the entire fiber laser system to have a reflection resistance exceeding a predetermined level.

A method of evaluating a reflection resistance of a fiber laser system in accordance with an aspect of the present invention is a method of evaluating a reflection resistance of each of a plurality of fiber lasers in a fiber laser system, the method including the steps of: (a) measuring a first power of a laser beam which the low reflection mirror of each of the plurality of fiber lasers has transmitted therethrough; (b) measuring a second power of a Stokes beam which the high reflection mirror of the each of the plurality of fiber lasers has transmitted therethrough; and (c) calculating, for each of the plurality of fiber lasers, a ratio of the second power to the first power, based on a result of measurement made in the step (a) and a result of measurement made in the step (b).

According to the above configuration, by evaluating the ratio in the step (c), it is possible to quantitatively evaluate the reflection resistances of the respective fiber lasers in a state where the entire fiber laser system is in operation.

A method of improving a reflection resistance of a fiber laser system in accordance with an aspect of the present invention is a method of improving a reflection resistance of a fiber laser system which includes a plurality of fiber lasers, the method including the steps of: (a) calculating, for each of the plurality of fiber lasers, the ratio in accordance with the method described above; and (b) reducing a maximum value of the ratio in each of the plurality of fiber lasers, by (i) selecting, from the plurality of fiber lasers, at least one fiber laser including a fiber laser in which the value is the largest and (ii) carrying out power down control in which a power of a laser beam which is emitted from the at least one fiber laser selected from the plurality of fiber lasers is reduced.

As described earlier, the smaller the power of the laser beam is, the smaller the ratio tends to become. According to the above configuration, in the step (b), the power of the laser beam emitted from the at least one fiber laser including a fiber laser in which the ratio is the largest is reduced based on the above tendency. This allows a reduction in maximum value of the ratio in each of the fiber lasers, and ultimately allows an increase in reflection resistance of the entire fiber laser system.

A fiber laser in accordance with an aspect of the present invention includes: an amplifying optical fiber; a low reflection mirror provided at one end of the amplifying optical fiber; a high reflection mirror provided at the other end of the amplifying optical fiber; a laser beam measuring section configured to measure a power of a laser beam which the low reflection mirror has transmitted therethrough; and a Stokes beam measuring section configured to measure a power of a Stokes beam which the high reflection mirror has transmitted therethrough.

According to the above configuration, it is possible to achieve a fiber laser that can be used in the above fiber laser system. The same applies to a case where at least one fiber laser of the fiber laser system is replaced with an optical terminator or the like.

A fiber laser in accordance with another aspect of the present invention can be configured to further include: a calculation section configured to calculate a ratio of (i) the power of the Stokes beam which the high reflection mirror has transmitted therethrough to (ii) the power of the laser beam which the low reflection mirror has transmitted therethrough, based on a result of measurement made by the laser beam measuring section and a result of measurement made by the Stokes beam measuring section.

It can be said that, in a fiber laser, the larger the ratio is, the more easily oscillation at a wavelength of a Stokes beam occurs due to SRS. According to the above configuration, the calculation section calculates the ratio so that the reflection resistance of the fiber laser can be quantitatively evaluated in a state where the fiber laser is in operation.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1: Fiber laser system
2: Fiber laser
3: Fiber laser
4: Fiber laser
5: Output combiner
6: Multi-mode fiber
7: Output section
8: Processing target object
9: Calculation processing section
10: Optical fiber
21: Excitation light source (light emitting device)
23: Pump combiner
24: High reflection FBG (high reflection mirror)
25: Amplifying optical fiber
26: Low reflection FBG (low reflection mirror)
28: Laser beam measuring section
29: Stokes beam measuring section
91: Calculation section
92: Control section

The invention claimed is:
1. A fiber laser system, comprising:
a plurality of fiber lasers,
each of the plurality of fiber lasers including a laser beam measuring section, a Stokes beam measuring section, a low reflection mirror, and a high reflection mirror,
the laser beam measuring section being configured to measure a power of a laser beam which the low reflection mirror has transmitted therethrough,
the Stokes beam measuring section being configured to measure a power of a Stokes beam which the high reflection mirror has transmitted therethrough;
a calculation section configured to calculate, for each of the plurality of fiber lasers, a ratio of (i) the power of the Stokes beam which the high reflection mirror has transmitted therethrough to (ii) the power of the laser beam which the low reflection mirror has transmitted therethrough, based on a result of measurement made by the laser beam measuring section and a result of measurement made by the Stokes beam measuring section; and
a control section configured to reduce a maximum value of the ratio in each of the plurality of fiber lasers, by (i) selecting, from the plurality of the fiber lasers, at least one fiber laser including a fiber laser in which the ratio is the largest and (ii) carrying out power down control in which a power of a laser beam which is emitted from the at least one fiber laser selected from the plurality of fiber lasers is reduced.

2. The fiber laser system as set forth in claim 1, wherein:
the laser beam measuring section includes a first wavelength selecting filter which selectively transmits therethrough light having a lasing wavelength of a corresponding one of the plurality of fiber lasers; and
the Stokes beam measuring section includes a second wavelength selecting filter which selectively transmits therethrough light having a wavelength which is obtained by adding, to the lasing wavelength of the corresponding one of the plurality of fiber lasers, a wavelength corresponding to a Raman shift.

3. The fiber laser system as set forth in claim 1, wherein:
the control section reduces a difference between the ratio as to the at least one fiber laser thus selected and a ratio as to an unselected fiber laser, by (i) carrying out the power down control or (ii) carrying out both of (a) power up control in which a power of a laser beam which is emitted from the unselected fiber laser is increased and (b) the power down control.

4. The fiber laser system as set forth in claim 1, wherein:
the control section selects a fiber laser in which the ratio exceeds a predetermined ratio, from the plurality of fiber lasers, as a target for which a power of a laser beam is to be reduced.

5. A method of improving a reflection resistance of a fiber laser system which includes a plurality of fiber lasers, the method comprising the steps of:
(a) measuring a first power of a laser beam which a low reflection mirror of each of the plurality of fiber lasers has transmitted therethrough;
(b) measuring a second power of a Stokes beam which a high reflection mirror of the each of the plurality of fiber lasers has transmitted therethrough; and
(c) calculating, for each of the plurality of fiber lasers, a ratio of the second power to the first power, based on a result of measurement made in the step (a) and a result of measurement made in the step (b); and
(d) reducing a maximum value of the ratio in each of the plurality of fiber lasers, by (i) selecting, from the plurality of fiber lasers, at least one fiber laser including a fiber laser in which the ratio is the largest and (ii) carrying out power down control in which a power of a laser beam which is emitted from the at least one fiber laser selected from the plurality of fiber lasers is reduced.

* * * * *